(12) United States Patent
Jemüller et al.

(10) Patent No.: US 12,247,671 B2
(45) Date of Patent: Mar. 11, 2025

(54) HYDRAULIC VALVE

(71) Applicant: HAWE Hydraulik SE, Aschheim (DE)

(72) Inventors: Georg Jemüller, Aschheim (DE);
Dominic Nießlein, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 150 days.

(21) Appl. No.: 18/328,933

(22) Filed: Jun. 5, 2023

(65) Prior Publication Data

US 2024/0019037 A1 Jan. 18, 2024

(30) Foreign Application Priority Data

Jul. 14, 2022 (DE) ...................... 10 2022 207 208.1

(51) Int. Cl.
| | |
|---|---|
| *F16K 27/02* | (2006.01) |
| *F16K 1/12* | (2006.01) |
| *F16K 1/38* | (2006.01) |
| *F16K 11/10* | (2006.01) |
| *F16K 15/04* | (2006.01) |

(Continued)

(52) U.S. Cl.
CPC ............. *F16K 11/10* (2013.01); *F16K 1/126* (2013.01); *F16K 1/385* (2013.01); *F16K 15/04* (2013.01); *F16K 31/122* (2013.01); *F16K 27/0209* (2013.01); *F16K 27/0254* (2013.01); *F16K 27/0263* (2013.01); *F16K 2200/201* (2021.08); *F16K 2200/202* (2021.08); *F16K 2200/3051* (2021.08); *F16K 2200/501* (2021.08)

(58) Field of Classification Search
CPC .......... F16K 11/10; F16K 1/126; F16K 1/385; F16K 15/04; F16K 31/122
See application file for complete search history.

(56) References Cited

U.S. PATENT DOCUMENTS

| | | | | |
|---|---|---|---|---|
| 4,535,809 A | * | 8/1985 | Andersson | .......... F15B 13/0405 |
| | | | | 137/625.6 |
| 2003/0070428 A1 | * | 4/2003 | Heusser | .................. F04B 17/03 |
| | | | | 60/468 |
| 2020/0332911 A1 | * | 10/2020 | Wechsel | .............. F16K 31/0693 |

FOREIGN PATENT DOCUMENTS

| | | |
|---|---|---|
| DE | 10 2019 218 401 B3 | 4/2021 |
| EP | 0 902 194 A1 | 3/1999 |
| EP | 1 063 431 A1 | 12/2000 |

OTHER PUBLICATIONS

Examination Report for German Application No. 10 2022 207 208.I, dated Feb. 25, 2023, 11 pages.

* cited by examiner

*Primary Examiner* — Kevin R Barss
(74) *Attorney, Agent, or Firm* — DINSMORE & SHOHL LLP

(57) ABSTRACT

A hydraulic valve includes a valve housing, a valve cone, a spring housing, a check valve, a first hydraulic connection and a second hydraulic connection. The valve housing has a valve seat and the valve cone is movable in the valve housing between a closed position and an open position. In the closed position, the valve cone is in contact with the valve seat and blocks a first flow path between the first and the second hydraulic connection. In the open position, the valve cone is lifted off the valve seat and the first flow path is opened. A spring element is disposed in the spring housing, which biases the valve cone into the closed position. The check valve is disposed in the valve cone and opens a second flow path from the second hydraulic connection to the first hydraulic connection when pressure is applied to the second hydraulic connection.

14 Claims, 5 Drawing Sheets

(51) Int. Cl.
*F16K 31/04* (2006.01)
*F16K 31/122* (2006.01)

HYDRAULIC VALVE

CROSS REFERENCE TO RELATED APPLICATION

This application claims priority to German Application 10 2022 207 208.1, filed Jul. 14, 2022, which is hereby incorporated by reference in its entirety.

FIELD OF THE INVENTION

The present invention relates to a hydraulic valve, in particular a load holding valve which is preferably configured as a load holding valve cartridge.

BACKGROUND OF THE INVENTION

Hydraulic valves configured as load holding valves or load holding valve cartridges are generally known from the prior art. They are used in a hydraulic system to prevent uncontrolled lowering, for example in forklifts or lifting platforms. For this purpose, such a hydraulic valve has a valve seat and a valve cone that rests against the valve seat without leakage. The valve cone is preloaded with a force that is greater than the maximum possible load pressure. In particular, adjustable spring systems are used for this purpose, which are disposed in a spring housing with corresponding spring plates. In most cases, a hydraulic throttle or orifice is provided which acts in dependency of the opening stroke to allow controllable lowering under load. Lowering is effected by lifting the valve cone of the load holding valve, for example by applying hydraulic control pressure to a control port. If the total of the load pressure and the control pressure exceeds the preload force, the load holding valve opens. The desired lowering speed is influenced by the control pressure. In addition, such valves regularly have a check valve that bypasses the valve seat to allow lifting under load. Such load holding valves are known, for example, from EP 0 902 194 A1, EP 1 063 431 A1 and DE 10 2019 218 401 B4.

Such hydraulic valves are regularly screwed into or fixed in a block and switched by applying a control pressure in such a way that two hydraulic connections connected to corresponding channels in the block are interconnected for lowering the load. Here, the hydraulic fluid flows from a first hydraulic connection, to which a hydraulic consumer such as a hydraulic cylinder is regularly connected, past the valve cone lifted from the valve seat to the other second hydraulic connection, to which, for example, a spool valve or a switch valve is connected. The disadvantage of such a solution is that both channels have to be provided in the block, which is undesirable in some hydraulic valve applications, increases the manufacturing costs of the block and also requires corresponding installation space.

Solutions have therefore emerged in which a hydraulic connection is provided on the spring housing of the hydraulic valve. Such solutions are less expensive to manufacture, save installation space and can be used in a wide range of applications.

With a lifted valve cone, the hydraulic fluid flows outward at the valve seat in the direction of the spring housing. At the connection point of the spring housing, the hydraulic fluid is diverted and flows into the spring housing via the spring plate. The deflections result in different cross-sectional ratios and thus also in less favorable flow resistances overall. This also leads to an increased overall system energy balance and further increases the risk of particles and contaminants being deposited.

In addition, with a hydraulic connection on the spring housing, there is also the risk that a line connected to it, for example when used in a forklift or a crane arm, gets stuck or caught in use and the spring housing is damaged, if not completely torn off. This causes the preload by the spring element to be lost and the actual reference variable, namely the opening of the valve cone, which can be defined via the spring preload, to drop abruptly to "0" (zero), causing any lifted load to drop uncontrollably. This can lead to serious or even fatal accidents.

It is therefore an objective of the present invention to provide a hydraulic valve, in particular one configured as a load holding valve, which has favorable flow and cross-sectional conditions with a simple design. In addition, it is an objective of the present invention to provide a hydraulic valve, in particular a load holding valve, in which the risk of damage to the spring housing and the resulting danger is minimized.

The problem is solved with a hydraulic valve according to the embodiments described herein.

SUMMARY OF THE INVENTION

According to the invention, a hydraulic valve with a valve housing, a valve cone, a spring housing, a check valve, a first hydraulic connection and a second hydraulic connection is proposed. The hydraulic valve is in particular a load holding valve and preferably a load holding valve cartridge for screwing into a block. The valve housing comprises a valve seat, wherein the valve cone is movably disposed in the valve housing between a closed position and an open position. In the closed position, the valve cone abuts the valve seat, and in the open position, the valve cone is lifted from the valve seat. In the closed position, the valve cone blocks a first flow path between the first hydraulic connection and the second hydraulic connection. In the open position, the valve cone opens the first flow path from the first hydraulic connection to the second hydraulic connection. A spring element is disposed in the spring housing, which biases the valve cone into the closed position. The check valve is disposed in the valve cone and, when pressure is applied to the second hydraulic connection, opens a second flow path from the second hydraulic connection to the first hydraulic connection. According to the invention, the valve cone has a fluid guide passing through the valve cone upstream of the check valve as viewed in the direction of flow from the second hydraulic connection to the first hydraulic connection, the fluid guide being part of either the first flow path, the second flow path or both flow paths.

In other words, in the open position of the valve cone, the hydraulic fluid flows along the first flow path, and the fluid guide may be part of this first flow path. The hydraulic fluid then flows through the fluid guide into the valve cone and from there to the second hydraulic connection. The hydraulic fluid is thus not directed past the outer surface of the valve cone to the second hydraulic connection, but is directed via the fluid guide into the interior of the valve cone to flow from there to the second hydraulic connection. This means that unfavorable deflections and changes in cross-section can be largely avoided, so that there is no undesirable increase in flow resistance. Consequently, the buildup of dirt and other foreign matter can also be avoided. This results in a longer service life and a favorable overall system energy balance. Alternatively, it is preferable if the fluid guide is part of the second flow path and provides favorable flow conditions when the load is lifted. This is particularly advantageous if the second hydraulic connection is also provided on the valve housing.

In addition, this also increases overall component stability. This is because the fluid guide is formed in a section of the valve cone in which no tensile forces are transmitted. Only the preload force of the spring element must be absorbed in this area.

Preferably, the spring housing comprises the second hydraulic connection. For example, the second hydraulic connection can be connected to a pressure source, a spool valve, or a shuttle valve. This enables an overall less expensive design of the hydraulic valve.

According to the invention, there is further proposed a hydraulic valve with a valve housing, a valve cone, a spring housing, a check valve, a first hydraulic connection and a second hydraulic connection is proposed. The hydraulic valve is in particular a load holding valve and preferably a load holding valve cartridge for screwing into a block. The valve housing comprises a valve seat, wherein the valve cone is movably disposed in the valve housing between a closed position and an open position. In the closed position, the valve cone abuts the valve seat, and in the open position, the valve cone is lifted from the valve seat. In the closed position, the valve cone blocks a first flow path between the first hydraulic connection and the second hydraulic connection. In the open position, the valve cone opens the first flow path from the first hydraulic connection to the second hydraulic connection. A spring element is disposed in the spring housing, which biases the valve cone into the closed position. The check valve is disposed in the valve cone and, when pressure is applied to the second hydraulic connection, opens a second flow path from the second hydraulic connection to the first hydraulic connection. The spring housing comprises the second hydraulic connection, an external thread for screwing the hydraulic valve into a block, and a sealing member disposed on the outer circumference of the spring housing. According to the invention, the sealing member is arranged in the axial direction between the external thread and the valve housing. In other words, the sealing member is arranged between the external thread and the valve housing in such a way that the external thread lies outside the sealing member in the direction of the second hydraulic connection. The external thread is thus dry and does not lie in the area of the hydraulic fluid.

A possible weak point in a spring housing is regularly the area of the sealing member, because the cross section of the spring housing is reduced or smallest there. The arrangement of the sealing member according to the invention ensures that mainly compressive loads and virtually no tensile loads are present in the area of the sealing member. Possible tensile loads caused, for example, by a line that is fixed to the second hydraulic connection and has become stuck are absorbed via the external thread and not in the area of the sealing member, where the smallest cross-section of the spring housing is regularly present. Although the line may break off at the second hydraulic connection and cause a functional failure of the hydraulic valve or the hydraulic line, the preload applied via the spring element is not lost and a sudden drop in the actual reference variable to "0" is prevented. The danger of an uncontrolled lowering of a possibly lifted load is thus eliminated.

Preferably, the sealing member is disposed in a circumferential receiving groove on the outer circumference of the spring housing. The sealing member can in particular be a sealing ring, for example an O-ring.

Preferably, the valve cone has an axially extending receiving space, wherein the fluid guide comprises at least one bore extending from the outer surface of the valve cone to the receiving space. In this regard, it is preferably if the fluid guide comprises a plurality of bores. Via the bores, the hydraulic fluid can flow into the receiving chamber and then to the second hydraulic connection largely without flow resistance.

The bores can be arranged at regular intervals or in groups. The arrangement in groups has the advantage that bored are only made in the valve cone where most hydraulic fluid flows along. This reduces the manufacturing costs of the valve cone compared with regularly spaced bores.

Preferably, the check valve is disposed in the receiving space. In this way, a particularly space-saving configuration of the hydraulic valve and especially of the valve cone can be achieved.

Preferably, the valve housing comprises a fluid chamber, wherein the fluid chamber is part of the first flow path, and the fluid guide opens into the fluid chamber at least in the open position of the valve cone. Preferably, the fluid guide also opens into the fluid chamber in the closed position of the valve cone. In the open position of the valve cone, the hydraulic fluid thus flows past the valve seat into the fluid chamber and from there via the fluid guide into the interior of the valve cone and then to the second hydraulic connection. This results in favorable flow and cross-sectional conditions overall.

Preferably, the valve housing has an axial bore with an inner circumferential surface for receiving the valve cone, the fluid chamber being formed by an at least partially circumferential recess on the inner circumferential surface of the axial bore. Preferably, the recess is completely circumferential. It should be noted here that an axial bore does not necessarily mean a bore that completely penetrates the valve cone. Rather, the axial bore can also be a bore that only partially penetrates the valve cone.

Preferably, the valve cone has a spring housing end facing the spring housing, whereby the valve cone is guided in the valve housing between the spring housing end and the fluid guide. In other words, the valve cone is guided in the valve housing in the area of its axial end facing the spring housing, for example in the manner of a slide fit. This ensures particularly good axial guidance during movement of the valve cone.

The hydraulic valve preferably comprises a spring plate disposed in the spring housing, the spring plate comprising an axial passage. The valve cone preferably abuts the spring plate so that the preload force of the spring element is transmitted to the valve cone via the spring plate. The axial passage is preferably relatively large so that the hydraulic fluid can flow largely unhindered in this area from the first hydraulic connection to the second hydraulic connection.

Preferably, the hydraulic valve has a third hydraulic connection, whereby a control pressure can be applied to the third hydraulic connection in order to move the valve cone into the open position against a force of the spring element. For this purpose, the hydraulic valve preferably has control piston acting on the valve cone, it being possible to apply pressure to the control piston via the third hydraulic connection. The control piston can be formed integrally with the valve cone or separately from the valve cone. In this way, the hydraulic valve can be opened as required via a corresponding control pressure, so that hydraulic fluid can flow in a controlled manner from the first hydraulic connection to the second hydraulic connection. Of course, it is also conceivable that the hydraulic valve can be opened electromagnetically or manually as an alternative or supplement.

DETAILED DESCRIPTION OF THE DRAWINGS

Figure 1:
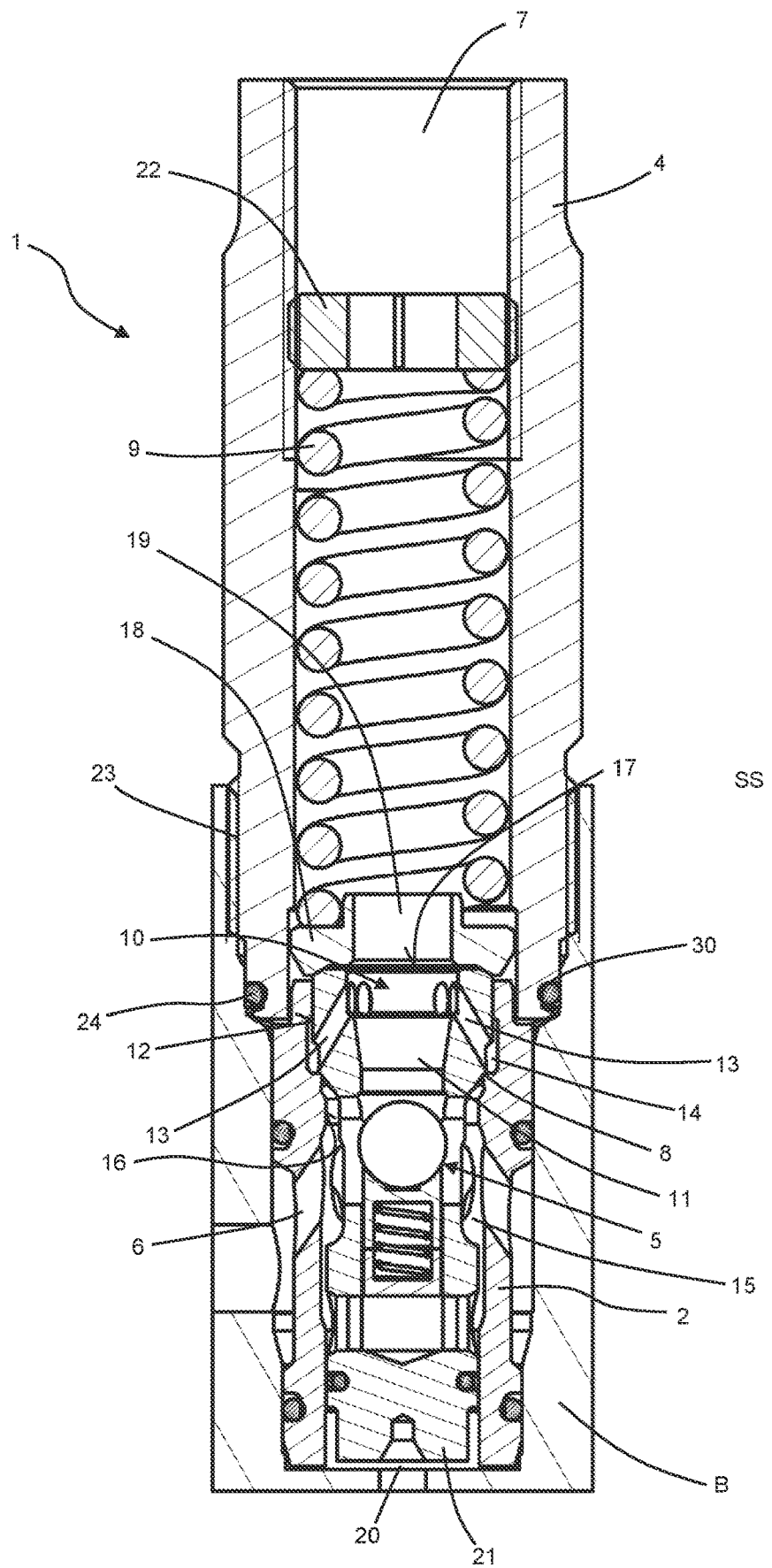
FIG. 1 is a section through a hydraulic valve according to a first embodiment, with the valve cone in the closed position and the check valve open.
Figure 2:
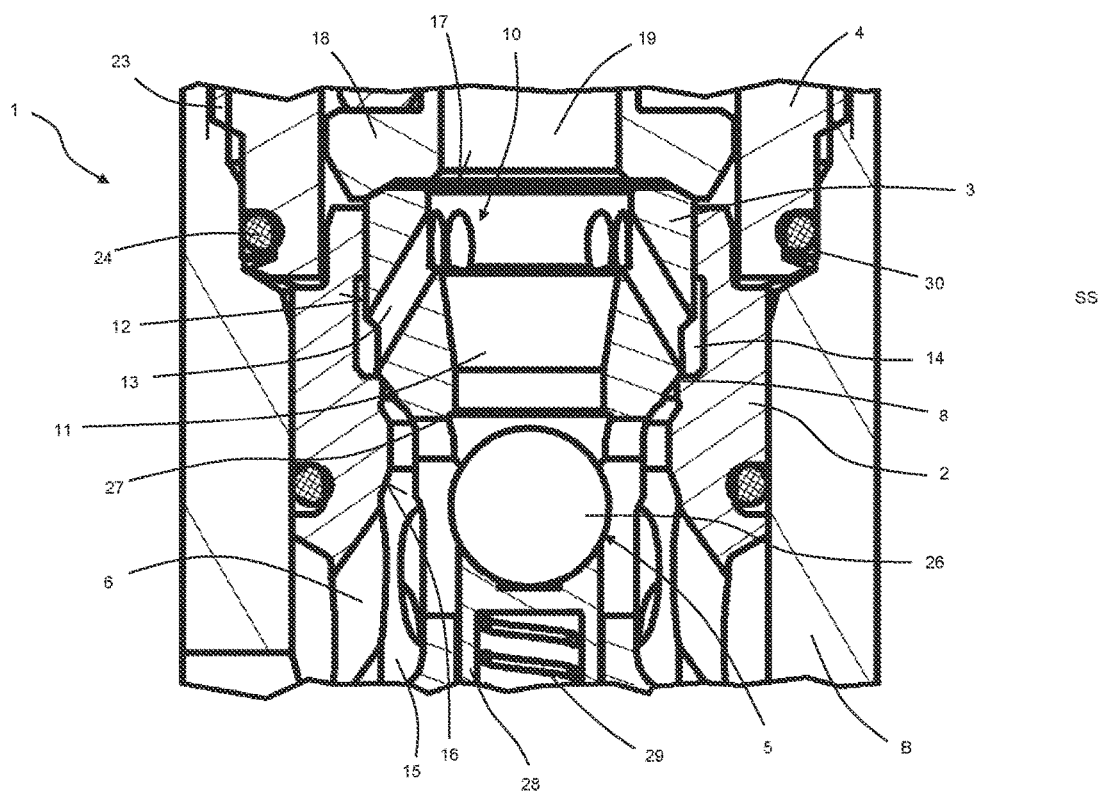
FIG. 2 is a detailed view of the hydraulic valve shown in FIG. 1.

FIGS. 1 to 4 depict a hydraulic valve 1 configured as a load holding valve according to a first embodiment of the present invention. As shown, the load holding valve 1 is configured as a load holding valve cartridge which is screwed into a block B. Such a load holding valve cartridge 1 is used, for example, to control a hydraulic cylinder or other hydraulic consumer against a load, to lower it in a controlled manner under load according to a predetermined quantity characteristic (pressure difference across the load holding valve 1 over the quantity or volume flow) with a control pressure and a predetermined control behavior, and to keep the load free of leakage in the non-actuated state.

For this purpose, the load holding valve cartridge 1 has a valve housing 2 with a valve cone 3 axially movable therein, a first hydraulic connection 6 and a second hydraulic connection 7. Furthermore, the load holding valve cartridge 1 has a spring housing 4 with a spring element 9 disposed therein. On the one hand, the spring element 9 is supported on a first spring plate 18 arranged axially movably in the spring housing 3. On the other hand, the spring element 9 is supported on a second spring plate 22 fixed in the spring housing. The preload of the spring element 9 can be adjusted by moving the second spring plate 22 in a known manner by screwing it in and out along the spring housing 4. The preload force of the spring element 9 is transmitted via the first spring plate 18 to a spring housing end 17 of the valve cone 3, so that the latter is preloaded to the closed position SS shown in FIG. 1.

The spring housing 4 has an external thread 23 for screwing the spring housing 4 into the block B. A sealing member 24 is provided to prevent hydraulic fluid under high pressure from escaping along the external thread 23. As shown in particular in FIG. 2 and FIG. 4, the sealing member 24 is formed as a sealing ring which is received in a corresponding receiving groove 30 on the outer circumference of the spring housing 4. In this exemplary embodiment, the sealing ring 24 is an O-ring. Seen in the axial direction from the second hydraulic connection 7 to the valve housing 2, the sealing member 24 is arranged downstream of the external thread 23 i.e., in the screwed-in state of the load holding valve cartridge 1 in the block B between the external thread 23 and the valve housing 2. In this way, it can be ensured that the structurally weaker point of the spring housing 4 due to the receiving groove 30 is largely not subjected to any tensile load even in the event of an unintentional external force acting on the spring housing 4, and the risk of the spring housing 4 tearing off at this point is eliminated.

Figure 3:
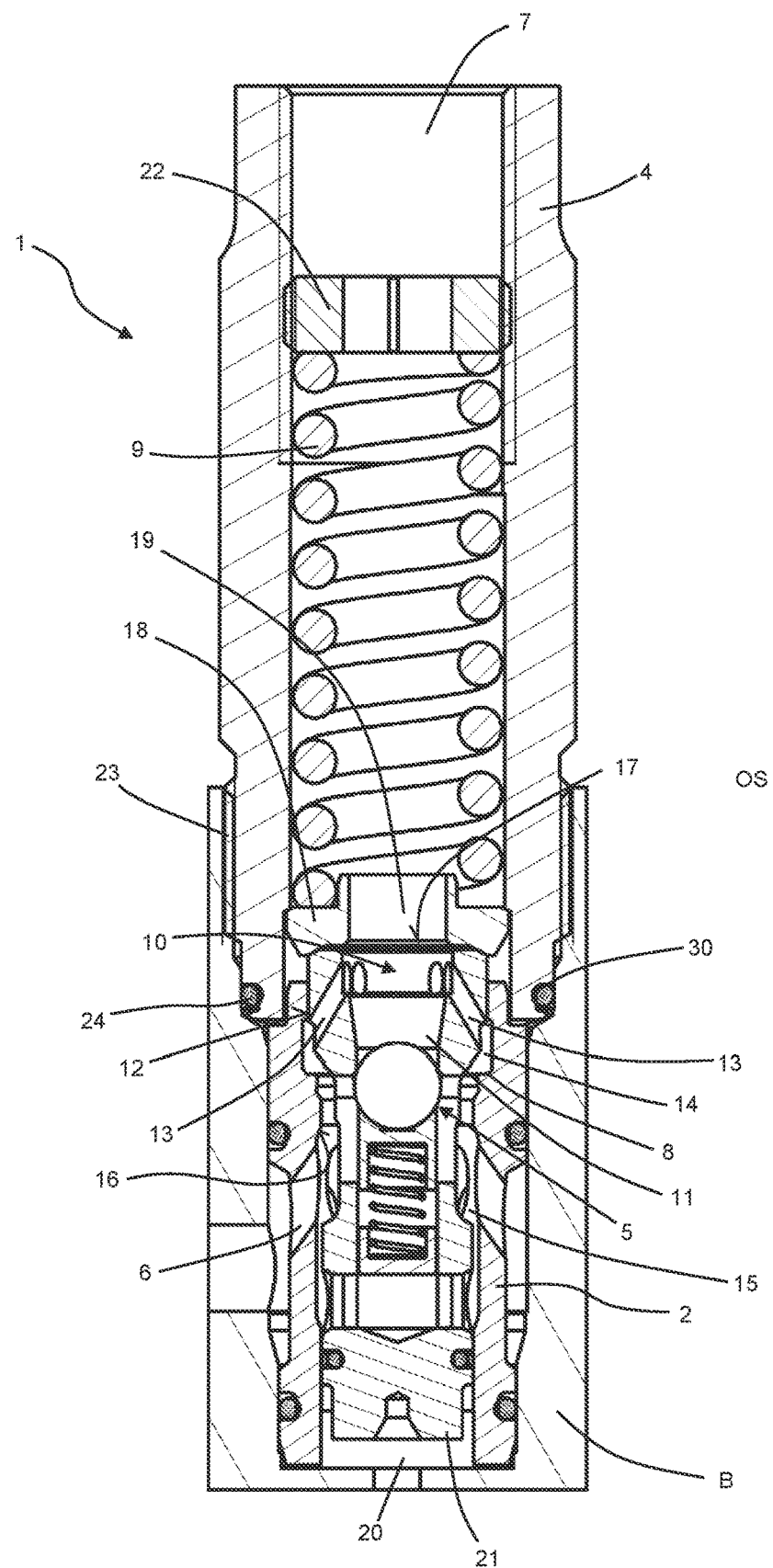
FIG. 3 is the hydraulic valve according to FIG. 1, with the valve cone in the open position and the check valve closed.
Figure 4:
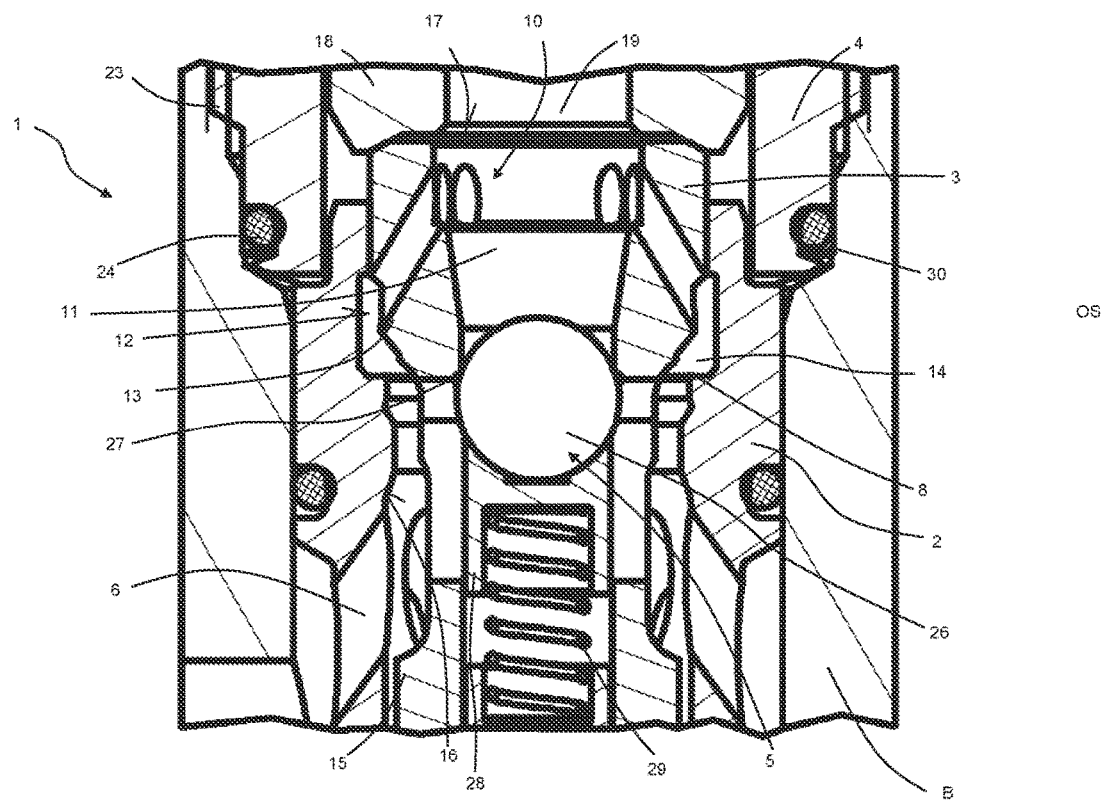
FIG. 4 is a detailed view of the hydraulic valve shown in FIG. 3.

As shown in FIG. 1 and FIG. 3, the second hydraulic connection 7 is disposed at the axial end of the spring housing 4 facing away from the valve cone 3. The first hydraulic connection 6 is connected in a conventional manner to a channel in the block B. A hydraulic consumer, for example a hydraulic cylinder, which can be extended and retracted against a load, is regularly connected to the first hydraulic connection 6. At the second hydraulic connection 7, for example, a pressure source, a spool valve or a shuttle valve is connected in a conventional manner. In the closed position SS shown in FIG. 1, the load holding valve cartridge 1 is not actuated and a load applied via the hydraulic cylinder connected to the first hydraulic connection 6 is held free of leakage, since the valve cone 3 rests against a valve seat 8 formed on the valve housing 2 and blocks a first flow path between the first hydraulic connection 6 and the second hydraulic connection 7, as will be described in more detail below.

To lift a load via the hydraulic cylinder connected to the first hydraulic connection 6, the first hydraulic connection 6 must be pressurized. For this purpose, the load holding valve cartridge 1 has a check valve 5 bypassing the valve seat 8 to open a second flow path from the second hydraulic connection 7 to the first hydraulic connection 6.

The check valve 5 is received in an axially extending receiving space 11 of the valve cone. As shown, the check valve 5 is configured as a ball check valve and comprises a ball 26 which, in the closed position of the check valve 5, rests against a check valve seat 27 formed in the receiving space 11 of the valve cone 3, cf. also FIG. 3. The ball 26 is supported on a cup 28 in which a spring element 29 is received. The spring element 29 generates a relatively small force which is transmitted to the ball 26 via the cup 28 and ultimately serves only to hold the ball 26 in a pressure-free state against the check valve seat 27. When pressure is applied to the second hydraulic connection 7, the ball 26 is displaced axially against the closing force of the spring element 29 due to the pressure then present in the receiving chamber 11, so that the ball 26 is lifted off the check valve seat 27, cf. FIG. 1 and FIG. 2. The hydraulic fluid can then flow from the receiving chamber 11 to the first hydraulic connection 6 along the second flow path and the hydraulic cylinder connected there extends. The load is lifted.

In a condition in which a load is held free of leakage, the load pressure applied through the first hydraulic connection 6 also acts on the ball 26 so that it safely abuts against the check valve seat 27.

For controlled lowering of the load, the first hydraulic connection 6 must be connected to the second hydraulic connection 7. For this purpose, the valve cone 3 is moved from the closed position SS shown in FIG. 1 to the open position OS shown in FIG. 3. For this purpose, the valve cone is lifted from the valve seat 8 formed on the valve housing 2 against the preload force of the spring element 9 and the first flow path between the first hydraulic connection 6 and the second hydraulic connection 7 is released in order to lower the load in a controlled manner.

In order to move the valve cone 3, the valve housing 2 in this embodiment has a third hydraulic connection 20, via which a control pressure can be applied. The control pressure applied to the third hydraulic connection 20 acts on a control piston 21 of the load holding valve cartridge 1. In this exemplary embodiment, the control piston 21 is formed integrally with the valve cone 3 so that pressurization of the third hydraulic connection 20 with a correspondingly high control pressure (i.e., that the total pressure of open-loop pressure and open-loop pressure is higher than the total pressure of the valve cone 3) is possible. (i.e., the total pressure from the control pressure and the load pressure exceeds the preload force of the spring element 9) moves the control piston 21 together with the valve cone 3 axially in the direction of the spring housing 4, so that the valve cone 3 is lifted from the valve seat 8.

In the open position OS of the valve cone 3 i.e., when the third hydraulic connection 20 is pressurized, hydraulic fluid can flow from the first hydraulic connection 6 to the second hydraulic connection 7 along the first flow path. Here, the hydraulic fluid first enters an axial bore 15 of the valve housing 2 via the first hydraulic connection 6 and flows past the valve seat 8 into a fluid chamber 14. In this exemplary embodiment, the fluid chamber 14 is formed as a circumferential groove on an inner circumferential surface 16 of the axial bore 15. The valve cone 3 has a fluid guide 10 with a plurality of bores 13 penetrating through the valve cone 3 by extending from the outer surface 12 of the valve cone 3 into the receiving chamber 11. As shown, the fluid guide 10 is provided upstream of the check valve 5 as viewed in the flow direction from the second hydraulic connection 7 to the first hydraulic connection 6. In this embodiment, the bores 13 are each grouped, and provided on the valve cone 3 so as to connect the main flowed regions of the fluid chamber 14 to the receiving chamber 11. The hydraulic fluid then flows from the fluid chamber 14 via the bores 13 of the fluid guide 10 into the receiving chamber 11 and from there in the direction of the second hydraulic connection 7. In order to ensure a flow as unhindered as possible, the first spring plate 18 comprises a relatively large axial passage 19.

In order to achieve particularly good guidance of the valve cone 3, the valve cone 3 is guided between the spring housing end 17 and the fluid guide 10 in the valve housing 2. As shown in particular in FIG. 2 and FIG. 4, the valve cone 3 is guided on a corresponding guide surface which, viewed from the first hydraulic connection 6 to the fluid chamber 14, is formed downstream of the fluid chamber 14 on the inner circumferential surface 16 of the axial bore 15.

Figure 5:
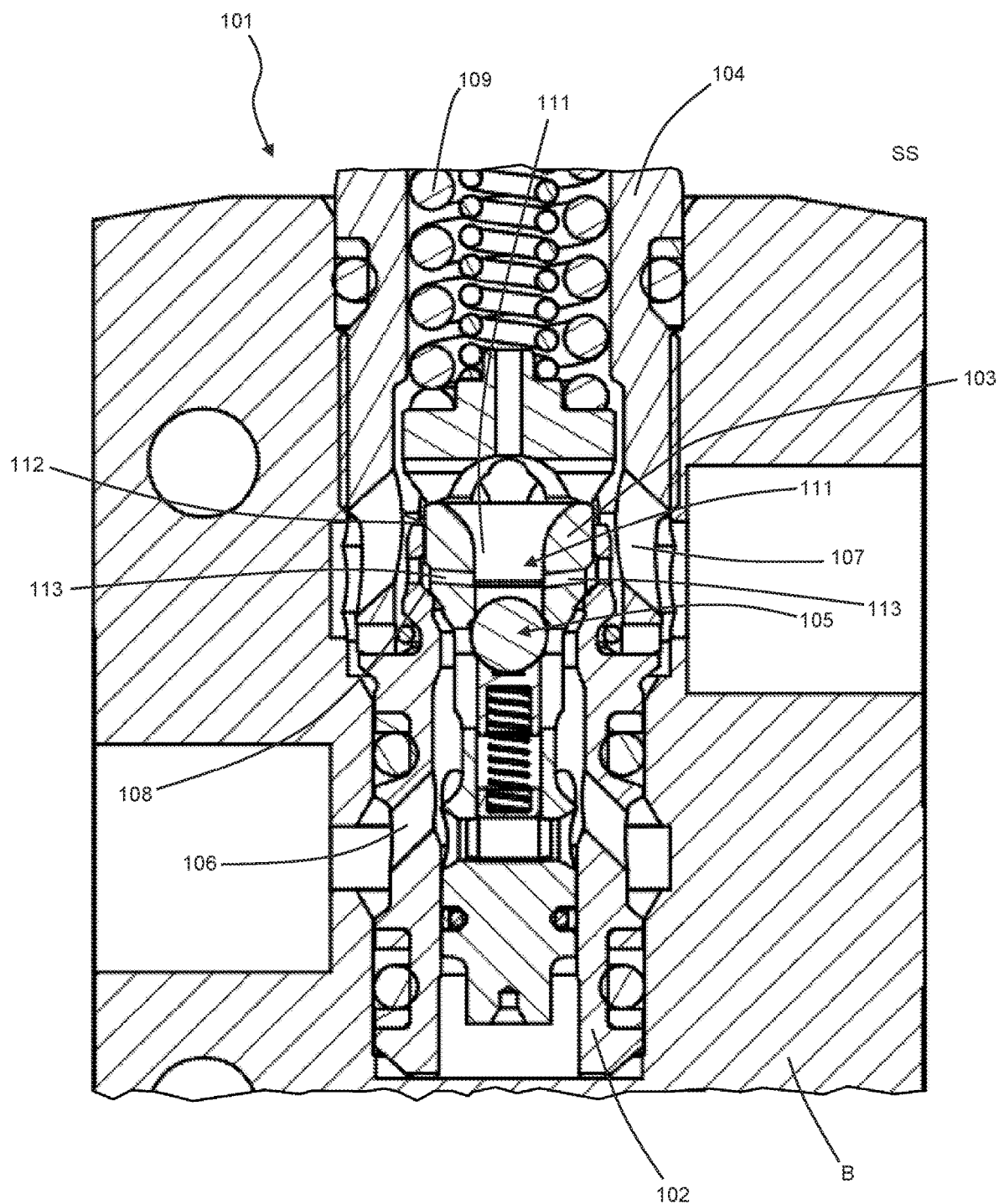
FIG. 5 is a section through a hydraulic valve according to a second embodiment.

In FIG. 5, a second exemplary embodiment of a hydraulic valve 101 configured as a load holding valve cartridge according to the invention is shown. The hydraulic valve 101 according to the second embodiment differs from the hydraulic valve 1 described above in the configuration of the second hydraulic connection 107. As shown, the second hydraulic connection 107 is not formed on the spring housing 104, but on the valve housing 102. The second hydraulic connection 107 is connected to a corresponding channel in the block B. In this embodiment, the fluid guide 110 of the valve cone 103 comprises two bores 113 extending from the outer surface 112 of the valve cone 103 into the receiving space 111 of the valve cone 103.

To lift the load via the hydraulic cylinder connected to the first hydraulic connection 106, pressure is applied to the second hydraulic connection 107. The hydraulic fluid then flows at least partially through the bores 113 of the fluid guide 110 into the receiving chamber 111 and opens the check valve 105. The hydraulic fluid then flows directly to the first hydraulic connection 106 and the load is lifted.

To lower the load, the valve cone 103 is moved in a controlled manner against the biasing force of the spring element 109 to the open position so that the valve cone 103 lifts off the valve seat 108. Hydraulic fluid can then flow from the first hydraulic connection 106 inside the valve housing 102 along the valve cone 103 to the second hydraulic connection 107.

It should be noted that the above embodiments are indeed described for a hydraulic valve configured as a load holding valve cartridge. However, the advantages of the invention are also applicable to other types of hydraulic valves, for example, pressure relief valves, check valves, load holding valves which are not designed as a cartridge, or stop valves.

LIST OF REFERENCE SIGNS 1, 101 hydraulic valve/load holding valve/load holding valve cartridge
2, 102 Valve housing
3, 103 valve cone
4, 104 spring housing
5, 105 check valve
6, 106 first hydraulic connection
7, 107 second hydraulic connection
8, 108 valve seat
9, 109 spring element
10, 110 fluid guide
11, 111 receiving chamber
12, 112 outer surface of the valve cone
13, 113 bore
14 fluid chamber
15 axial bore
16 inner circumferential surface of the axial bore
17 spring housing end
18 first spring plate
19 axial passage
20 third hydraulic connection
21 control piston
22 second spring plate
23 external thread
24 sealing member
26 ball
27 check valve seat
28 cup
29 spring element
30 receiving groove
B block
OS open position
SS closed position

The invention claimed is:
1. A hydraulic valve, comprising:
a valve housing;
a valve cone;
a spring housing;
a check valve;
a first hydraulic connection; and
a second hydraulic connection,
wherein the valve housing comprises a valve seat,
wherein the valve cone is movably disposed in the valve housing between a closed position and an open position,
wherein the valve cone abuts the valve seat in the closed position and blocks a first flow path between the first hydraulic connection and the second hydraulic connection,
wherein the valve cone is lifted off the valve seat in the open position and opens the first flow path from the first hydraulic connection to the second hydraulic connection,
wherein a spring element is disposed in the spring housing,
wherein the spring element biases the valve cone into the closed position, and
wherein the check valve is disposed in the valve cone and, when pressure is applied to the second hydraulic con- nection, opens a second flow path from the second hydraulic connection to the first hydraulic connection, wherein the valve cone has a fluid guide passing through the valve cone upstream of the check valve as viewed in the direction of flow from the second hydraulic connection to the first hydraulic connection, the fluid guide being part of the first and/or the second flow path.

2. The hydraulic valve according to claim 1, wherein the spring housing includes the second hydraulic connection.

3. The hydraulic valve according to claim 1, wherein the valve cone has an axially extending receiving space, the fluid guide comprising at least one bore extending from the outer surface of the valve cone to the receiving space.

4. The hydraulic valve according to claim 3, wherein the check valve is disposed in the receiving space.

5. The hydraulic valve according to claim 3, wherein the fluid guide includes a plurality of bores.

6. The hydraulic valve according to claim 1, wherein the valve housing comprises a fluid chamber, the fluid chamber being part of the first flow path, and the fluid guide opens into the fluid chamber at least in the open position of the valve cone.

7. The hydraulic valve according to claim 6, wherein the valve housing has an axial bore with an inner circumferential surface for receiving the valve cone, the fluid chamber being formed by an at least partially circumferential recess on the inner circumferential surface of the axial bore.

8. The hydraulic valve according to claim 1, wherein the valve cone has a spring housing end facing the spring housing, the valve cone being guided in the valve housing between the spring housing end and the fluid guide.

9. The hydraulic valve according to claim 1, wherein the hydraulic valve has a spring plate disposed in the spring housing, the spring plate has an axial passage, and the valve cone abuts against the spring plate.

10. The hydraulic valve according to claim 1, wherein the hydraulic valve has a third hydraulic connection, wherein a control pressure is applicable to the third hydraulic connection in order to move the valve cone into the open position counter to a force of the spring element, the hydraulic valve having a control piston acting on the valve cone, wherein pressure to the control piston is applicable via the third hydraulic connection.

11. The hydraulic valve according to claim 1, wherein the hydraulic valve is a load holding valve.

12. A hydraulic valve, comprising:
a valve housing;
a valve cone;
a spring housing;
a check valve;
a first hydraulic connection; and
a second hydraulic connection,
wherein the valve housing comprises a valve seat,
wherein the valve cone is movably disposed in the valve housing between a closed position and an open position,
wherein the valve cone abuts the valve seat in the closed position and blocks a first flow path between the first hydraulic connection and the second hydraulic connection,
wherein the valve cone is lifted off the valve seat in the open position and opens the first flow path from the first hydraulic connection to the second hydraulic connection,
wherein a spring element is disposed in the spring housing, the spring element biasing the valve cone into the closed position,
wherein the check valve is disposed in the valve cone and, when pressure is applied to the second hydraulic connection, opens a second flow path from the second hydraulic connection to the first hydraulic connection,
wherein the spring housing comprises the second hydraulic connection, an external thread for screwing the hydraulic valve into a block, and a sealing member disposed on the outer periphery of the spring housing,
wherein the sealing member is disposed in axial direction between the external thread and the valve housing.

13. The hydraulic valve according to claim 12, wherein the valve cone has a fluid guide passing through the valve cone upstream of the check valve as viewed in the direction of flow from the second hydraulic connection to the first hydraulic connection, the fluid guide being part of the first and/or the second flow path.

14. The hydraulic valve according to claim 12, wherein the hydraulic valve is a load holding valve.

* * * * *